United States Patent [19]

Iizuka et al.

[11] Patent Number: 4,967,181
[45] Date of Patent: Oct. 30, 1990

[54] FUEL LEVEL GAUGE PROVIDED WITH AN APPARATUS FOR ISSUING A WARNING ON THE AMOUNT OF REMAINING FUEL

[75] Inventors: Tsutomu Iizuka; Tatsuo Ikegaya, both of Shimada, Japan

[73] Assignee: Yazaki Corporation, Tokyo, Japan

[21] Appl. No.: 401,801

[22] Filed: Sep. 1, 1989

[30] Foreign Application Priority Data

Sep. 12, 1988 [JP] Japan ................................. 63-226347
Jun. 21, 1989 [JP] Japan ................................. 1-156839

[51] Int. Cl.$^5$ ............................................. B60Q 1/00
[52] U.S. Cl. ..................................... 340/450.2; 340/450; 340/618; 340/623; 340/625; 73/290 R; 73/305; 73/307; 116/110; 200/84 R; 200/190
[58] Field of Search ................ 340/450.2, 450.3, 612, 340/618, 623–625, 450; 73/290 R, 293, 305–308, 314; 116/109, 110, 227, 228; 200/84 R, 190

[56] References Cited

U.S. PATENT DOCUMENTS

3,623,043 11/1971 Bozoian ............................ 340/450.2
3,886,518  5/1975 Bozoian ............................ 340/450.2
4,513,277  4/1985 Moore et al. ..................... 340/450.2
4,799,047  1/1989 Saitoh ............................... 340/450.2

Primary Examiner—Donnie L. Crosland
Attorney, Agent, or Firm—Venable, Baetjer and Howard

[57] ABSTRACT

A fuel level gauge provided with a remaining-amount warning apparatus is arranged so that an indicating needle for indicating the amount of fuel remaining in a fuel tank operates in accordance with a change in the resistance of a resistor device consisting essentially of a resistance plate having a resistor and a sliding element capable of sliding on the resistor in accordance with a liquid level change in the fuel tank. A warning means for issuing a warning when the amount of remaining fuel reaches a predetermined amount also operates by utilizing the resistor device. In such a fuel level gauge, the warning means is activated by a circuit disposed to connect a remaining-amount warning point and the warning means, the remaining-amount warning point being the position on the resistor at which the sliding element is positioned when the amount of remaining fuel reaches a predetermined amount which requires issuance of a warning.

12 Claims, 7 Drawing Sheets

FUEL LEVEL GAUGE PROVIDED WITH AN APPARATUS FOR ISSUING A WARNING ON THE AMOUNT OF REMAINING FUEL

BACKGROUND OF THE INVENTION

1. Field of the Invention

This invention relates to a fuel level gauge arranged to indicate the amount of remaining fuel and provided with a remaining-amount warning apparatus for issuing a warning when the amount of remaining fuel reaches a predetermined amount.

2. Description of the Related Art

A known type of fuel level gauge arranged to indicate the amount of remaining fuel and provided with a remaining-amount warning apparatus for issuing a warning when the amount of remaining fuel reaches a predetermined amount comprises a scale for indicating the amount of remaining fuel on a dial, an indicating needle capable of travelling over the scale, and a warning lamp arranged to light when the amount of remaining fuel reaches a predetermined amount.

In this kind of fuel level gauge provided with a remaining-amount warning apparatus, coil means for driving the indicating needle and the warning lamp are connected to a sender secured to a fuel tank. This sender comprises a disk-shaped mounting board secured to the fuel tank, a stay secured to the frame of the mounting board, a thermistor attached to one end of the stay for detecting the amount of remaining fuel, a floating arm having a float at its distal end and rotatably secured at its proximal end to the aforesaid frame, a sliding element secured to the proximalend portion of the floating arm, and a resistance plate fixedly fitted in the frame, the sliding element sliding on the resistance plate in accordance with the floating motion of the floating arm.

The resistance plate comprises a board made of ceramics or the like, a plurality of resistors formed on the board in a printed form, and a plurality of conductive contact elements formed on the board in a printed form, one end of each of the conductive contact elements being connected to a corresponding one of the resistors and the sliding element sliding on the other ends of the conductive contact elements. One end of the resistors is connected to the coil means for driving the indicating needle, and the thermistor is connected to the warning lamp.

In the aforesaid fuel level gauge provided with such a remaining-amount warning apparatus, if the amount of remaining fuel decreases and the liquid level falls, the float descends correspondingly and the floating arm rotates downwardly. In accordance with the downward motion of the floating arm, the sliding element is caused to slide on the resistors (the conductive contact elements) to cause a variation in the resistance of the resistors. A current flowing in the coil means varies in accordance with this variation in the resistance of the resistors. Owing to the variation in the current, the composite magnetic field formed by the coil means varies so that the indicating needle travels o the scale to indicate the amount of remaining fuel.

Furthermore, if the amount of remaining fuel decreases to a predetermined amount, that is to say, if the liquid level falls to a preset position of the thermistor, the thermistor which has been immersed in the fuel is exposed to air. In consequence, the temperature of the thermistor changes and the resistance value thereof varies, thereby causing the warning lamp to light.

The fuel level gauge provided with the above-described remaining-amount warning apparatus is arranged to control a current flowing in the warning lamp by utilizing a variation which occurs in the resistance of the thermistor when the thermistor which has been placed in the fuel is exposed to air. Accordingly, it has been impossible to avoid the problems that the usable ranges of voltage and temperature are narrow and that the kinds of load resistor, warning lamp, etc. are limited since the influence of load characteristics is extremely serious.

Moreover, the operations of portions associated with an indication of the amount of remaining fuel (the floating arm, the sliding element and the resistance plate) are completely separate from those of portions associated with a warning on the amount of remaining fuel (the stay, the thermistor, etc). As a result, there is a case where an indication of the amount of remaining fuel may not accurately correspond to a warning on the amount of remaining fuel; for example, although an indication of the amount of remaining fuel represents that the amount of fuel has already decreased to a level which requires issuance of a warning, the warning lamp does not light, or although an indication of the amount of remaining fuel does not represent that the amount of fuel has decreased to a level which requires issuance of a warning, the warning lamp lights.

Moreover, since the thermistor is provided in the vicinity of the bottom of the fuel tank so that a warning can be issued when the amount of remaining fuel decreases to the minimum level, a long stay is needed, thus resulting in the problem that it is necessary to take care not to entwine the stay and the floating arm when the sender is to be mounted on the fuel tank.

SUMMARY OF THE INVENTION

To achieve the above-described problems with the related art, it is an object of the present invention to provide a fuel level gauge with a remaining-amount warning apparatus in which the usable ranges of voltage and temperature can be made wide and in which a load resistor, a warning lamp and the like are not limited to specific types.

It is another object of the present invention to provide a fuel level gauge with a remaining-amount warning apparatus in which an indication of the amount of remaining fuel accurately corresponds to a warning on the amount of remaining fuel It is still another object of the present invention to provide a fuel level gauge with a remaining-amount warning apparatus in which it is not necessary to take special care to mount a sender on a fuel tank.

To achieve the above objects, a fuel level gauge provided with a remaining-amount warning apparatus in accordance with the present invention comprises a resistor device consisting essentially of a resistance plate and a sliding element arranged to slide on resistors on the resistance plate in accordance with a liquid level change in the fuel tank, the fuel level gauge being arranged to provide an indication of the amount of remaining fuel by utilizing a change in the resistance of the resistor device. The fuel level gauge also comprises warning means for issuing a warning when the amount of remaining fuel reaches a predetermined amount. In such a fuel level gauge provided with the remaining-amount warning apparatus, a remaining-amount warning point is provided on the resistors on the aforesaid resistance plate, and a circuit for connecting this remaining-amount warning point and the aforesaid warning means is provided therebetween. The warning means is arranged to operate when the sliding element reaches the remaining-amount warning point on the resistors.

In this fuel level gauge provided with the remaining-amount warning apparatus described above, the sliding element slides on the resistors in accordance with a liquid level change of fuel, and the resistance value of the resistor device varies in accordance with the amount of remaining fuel. As the resistance of this resistor device varies, the value of a current flowing in, for example, a coil for driving the indicating needle varies. In accordance with the variation in this current, the composite magnetic field produced at the coil varies and the indicating needle is operated to indicate the amount of remaining fuel. When the amount of remaining fuel decreases and the sliding element slides to the remaining-amount warning point on the resistors, a current is allowed to flow in the warning means by the circuit and the warning means is activated.

As described above, in accordance with the present invention, the arrangement is such that a portion (resistor device) for indicating the amount of remaining fuel is utilized to activate means for issuing a warning on a decrease in the amount of remaining fuel, and no thermistor which has heretofore been needed is employed. Accordingly, since the usable ranges of voltage and temperature can be made wide, the kinds of load resistor, warning lamp and the like need not be specified. Moreover, an indication of the amount of remaining fuel accurately corresponds to a warning on the amount of remaining fuel. In addition, since it is possible to omit a stay for supporting the thermistor, it is not necessary to take special care to mount a sender on a fuel tank.

In a preferred form of the fuel level gauge provided with the remaining-amount warning apparatus according to the present invention, a delay circuit is provided in the aforesaid circuit.

In another preferred form of the fuel level gauge provided with the remaining-amount warning apparatus according to the present invention, the aforesaid delay circuit is incorporated in the circuit of the resistors, mounted on the board of the resistance plate, and sealed with a sealing compound which has durability with respect to fuel.

In the above-described fuel level gauge provided with the remaining-amount warning apparatus, even if the sliding element travels to the remaining-amount warning point, the warning means does not immediately operate, but operates after delayed by a predetermined time period by the delay circuit. Accordingly, there is no problem of the warning lamp flickering, and the circuit of the portion for providing an indication of the amount of remaining fuel is not adversely affected. Moreover, if the delay circuit is incorporated in the resistors and mounted on the resistance plate, an electrical power source or a board for exclusive use with the delay circuit is not needed and it is therefore possible to effectively utilize the board of the resistance plate.

In still another preferred form of the fuel level gauge provided with the remaining-amount warning apparatus in accordance with the present invention, the aforesaid delay circuit is provided with controlling means for controlling a voltage by utilizing the charge and the discharge of the capacitor of the delay circuit.

In this fuel level gauge provided with the remaining-amount warning apparatus, the charge and the discharge of the delay circuit are controlled by the controlling means which operates in accordance with a variation in voltage caused by the presence or absence of a current flowing in the remaining-amount warning point. Accordingly, even if a slight amount of current flows due to a fall in the insulation resistance of the resistance plate and the capacitor is charged, the warning means does not unnecessarily operate.

The "remaining-amount warning point" in this specification of the present invention means the position on the resistors at which the sliding element is located when the amount of remaining fuel reaches a level which requires issuance of a warning.

A warning lamp, a buzzer or the like may be employed as the "warning means".

The above and other objects and features of the present invention will be sufficiently understood from the following detailed description of embodiments of the present invention with reference to the accompanying drawings.

DETAILED DESCRIPTION OF THE INVENTION

Figure 1:
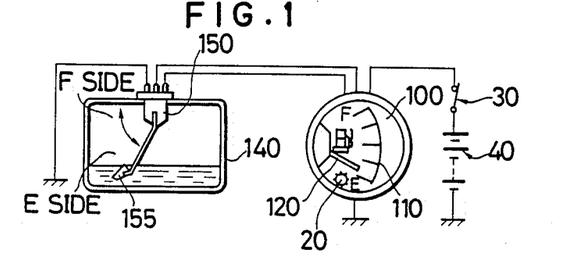
FIG. 1 is a schematic view which serves to illustrate the whole of one embodiment of a fuel level gauge provided with a remaining-amount warning apparatus in accordance with the present invention.

Referring to FIG. 1, a fuel level gauge provided with a remaining-amount warning apparatus comprises a scale 110 for indicating on a dial 100 the amount of fuel remaining in a tank 140, an indicating needle 120 arranged to travel over the scale 110, and a warning lamp 20 arranged to light when the amount of remaining fuel reaches a predetermined amount. The fuel level gauge is connected to an electrical power source 40 through a switch 30.

Figure 2:
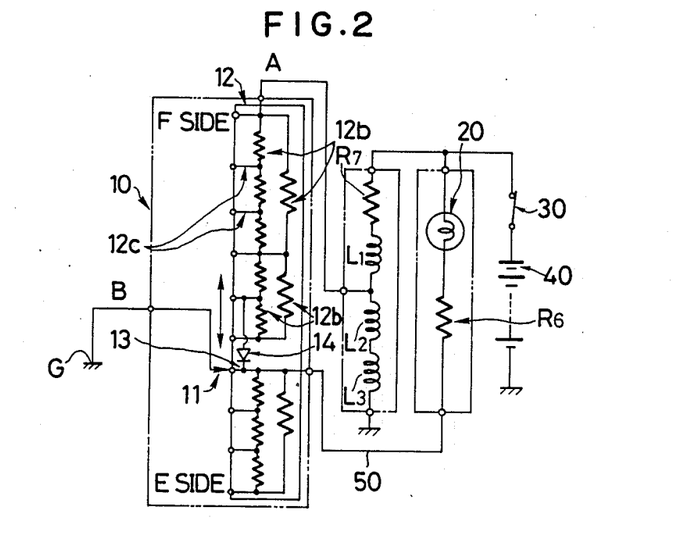
FIG. 2 is an electrical circuit diagram of the fuel level gauge of FIG. 1.
Figure 3:
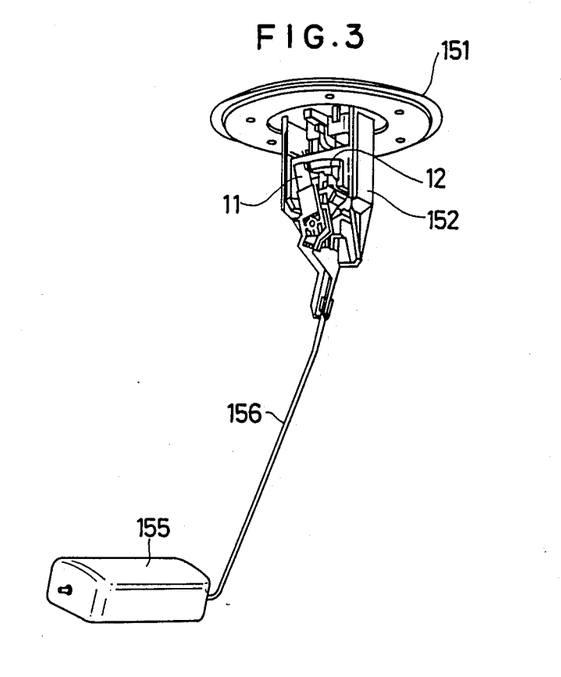
FIG. 3 shows the external appearance of the sender of the fuel level gauge of FIG. 1.

Coils L1 to L3 (refer to FIG. 2) for driving the indicating needle 120 and the warning lamp 20 are connected to a sender 150 attached to the fuel tank 140. As shown in FIG. 3, the sender 150 is constructed of a disk-shaped mounting base 151 secured to the fuel tank 140 and a frame 152, and a floating arm 156 is rotatably attached to the frame 152. The distal end of the floating arm 156 (the lower end as viewed in FIG. 3) is provided with a float 155, and a sliding element 11 is secured to the proximal end (the upper end as viewed in FIG. 3) of the floating arm 156. A resistance plate 12 is also secured to the frame 152, and the sliding element 11 is maintained in contact with the resistance plate 12 in such a manner that as the floating arm 156 rotates, the sliding element 11 slides on the resistance plate 12. As shown in FIG. 2, the sliding element 11 and the resistance plate 12 constitute a resistor device 10. The floating arm 156 rotates upward or downward as the float 155 moves upward or downward in accordance with an increase or a decrease in the amount of fuel in the fuel tank 140. As the floating arm 156 rotates, the sliding element 11 is caused to slide on resistors 12b (conductive contact elements 12c) of the resistance plate 12, thereby varying the value of resistance.

Figure 4:
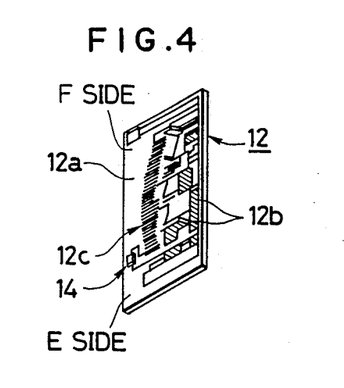
FIG. 4 is a perspective view of the resistance plate of the fuel level gauge of FIG. 1.

As shown in FIG. 4, the resistance plate 12 comprises a board 12a made of ceramics or the like, a plurality of resistors 12b, and a plurality of contact elements 12c, the resistors 12b and the contact elements 12c being formed on the board 12a in a printed form. One end of each of the contact elements 12c is connected to a corresponding one of the resistors 12b, and the sliding element 11 is arranged to slide on the other end. One end (the point A shown in FIG. 2) of the resistors 12b is connected between the coils L1 and L2, and the other end of the resistors 12b on which the sliding element 11 slides is connected to ground G through the conductive contact elements 12c and the sliding element 11.

If the fuel tank 140 is filled with fuel, the sliding element 11 is positioned on the F side shown in each of FIGS. 1 and 2. As the amount of fuel decreases, the sliding element 11 slides toward the E side shown in each of these figures. In accordance with the sliding movement of the sliding element 11 from the F side to the E side, the resistance value of the resistors 12b varies.

Figure 5:
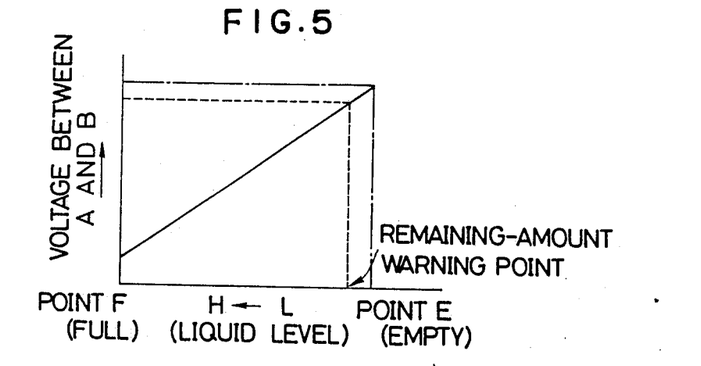
FIG. 5 is a graph showing the relationship between the liquid level change of fuel in a fuel tank (a change in the amount of remaining fuel) and the voltage between points A and B on the resistance plate (resistors)

FIG. 5 is a graph showing the relationship between the liquid level change of the fuel (a variation in the amount of remaining fuel) and the voltage provided between the points A and B of the resistance plate 12 (resistors 12b). As can be seen from the graph, if the liquid level is the highest (the sliding element 11 is positioned on the F side), the voltage is at its lowest level. As the liquid level falls from this highest position, the sliding element 11 slides toward the E side and the voltage rises.

In this manner, the sliding element 11 slides on the resistors 12b from the F side to the E side in accordance with the above-described liquid level change of the fuel, and the resistance value of the resistors 12b varies (the voltage between the points A and B varies). Accordingly, the amount of current flowing in the coils L1 to L3 changes and thus the magnetic fields generated at the coils L1 to L3 are caused to vary. These variations in the magnetic fields cause the indicating needle 120 to travel on the scale 110 to indicate the amount of remaining fuel.

The feature of this invention resides in the arrangement in which the means for issuing a warning on a decrease in the amount of remaining fuel is activated by utilizing the portion for indicating the amount of remaining fuel. Accordingly, the warning means according to the invention does not use a thermistor which has heretofore been needed.

More specifically, the position of the sliding element 11 on the resistors 12b (or conductive contact elements 12c) when it is indicated that the amount of remaining fuel has decreased to a level which requires supply of fuel is defined as a remaining-amount warning point 13, and a circuit 50 for connecting the remaining-amount warning point 13 and the warning lamp 20 is provided therebetween. Also, a diode 14 is interposed between the remaining-amount warning point 13 and the resistors 12b on the F side, and the anode side of the diode 14 is connected to the resistors 12b positioned on the F side with respect to the remaining-amount warning point 13, with the cathode side connected to the remaining-amount warning point 13. When the sliding element 11 is positioned on the F side with respect to the remaining-amount warning point 13, a current is prevented from flowing through the circuit 50 into the warning lamp 20.

The diode 14 is mounted on the board 12a as shown in FIG. 4. However, as long as the circuit is designed so that the diode 14 is arranged between the remaining-amount warning point 13 and the resistors 12b on the F side, the diode 14 may be disposed on a side nearer to the warning lamp 20. Moreover, a buzzer or the like may be used in place of the warning lamp 20.

With the arrangement and construction described above, even if a thermistor is not employed, when the amount of remaining fuel has decreased to a level which requires supply of fuel, it is possible to light the warning lamp 20. More specifically, when the amount of remaining fuel decreases and the sliding element 11 reaches the position of the conductive contact element 12c which corresponds to the remaining-amount warning point 13, a current flows to the warning lamp 20 through the sliding element 11, the conductive contact elements 12c, the circuit 50 and a resistor R6 so that the warning lamp 20 lights. Even if the amount of remaining fuel further decreases and the sliding element 11 travels toward the E side, the warning lamp 20 continues to light since a current continues to flow to the warning lamp 20 through the sliding element 11, the conductive contact elements 12c, the resistors 12b, the circuit 50 and the resistor R6.

It is to be noted that even when the sliding element 11 is travelling toward the E side from the remaining-amount warning point 13, a current flows in the coils L1 to L3 and an indication of the amount of remaining fuel is provided.

Figure 6:
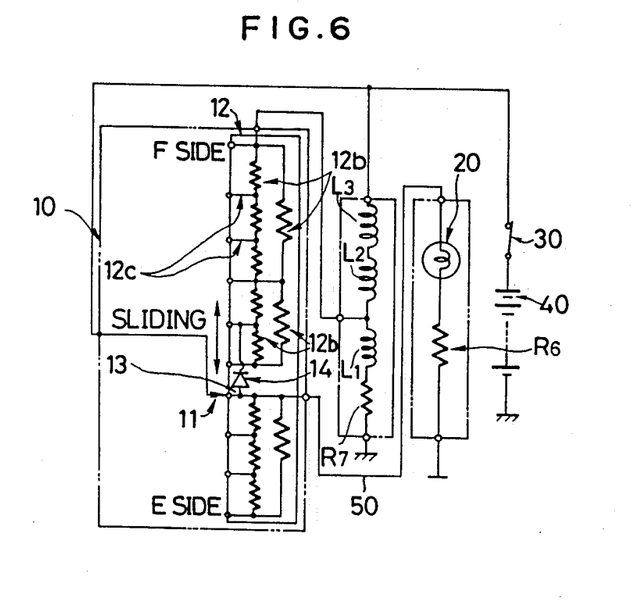
FIG. 6 is a circuit diagram showing a modification of the electrical circuit shown in FIG. 2.

FIG. 6 is a modification of the above-described embodiment. The sliding element 11 is connected to the plus side of the electrical power source 40 through the switch 30, and the anode side of the diode 14 is connected to the remaining-amount warning point 13 with the cathode side of the same connected to the resistors 12b on the F side with respect to the remaining-amount warning point 13. In other words, the plus and the minus of this modification are reverse to those of the circuit shown in FIG. 2. The remaining elements of this modification are the same as those of the circuit shown in FIG. 2.

In this case as well, in a manner similar to that of the circuit shown in FIG. 2, when the sliding element 11 reaches the remaining-amount warning point 13, a current is allowed to flow in the warning lamp 20 to cause it to light.

In each of the circuits shown in FIGS. 2 and 6, the current which causes the warning lamp 20 to light passes through the sliding element 11, the conductive contact elements 12c, the remaining-amount warning point 13, the circuit 50, and the resistor R6. If the value of this current is large, the problem that an indication of the amount of remaining fuel is adversely affected in a range beyond the remaining-amount warning point 13. In addition, if the floating arm 156 vibrates due to the liquid level changes of the fuel in the fuel tank which may be caused by vibrations or the like and the sliding element 11 temporarily travels towards the F side beyond the remaining-amount warning point 13, another problem will be encountered that the warning lamp 20 is repetitively turned on and off to flicker.

Figure 7:
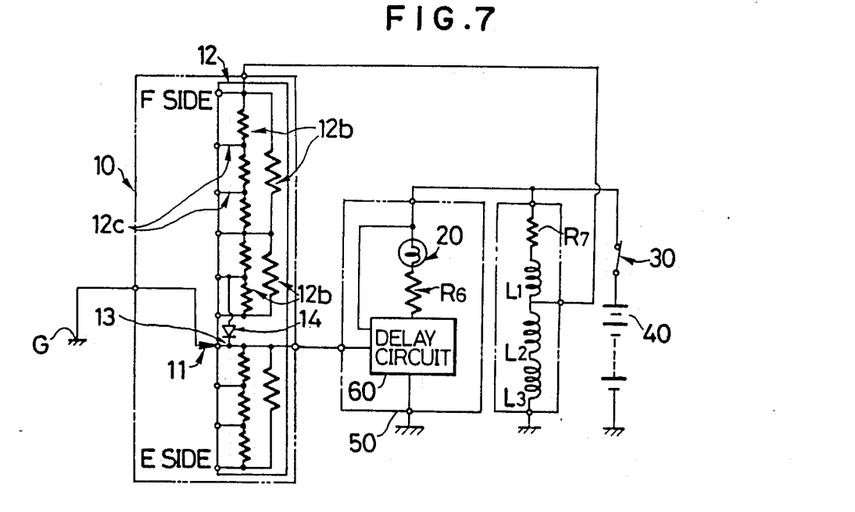
FIG. 7 is a circuit diagram showing another embodiment of the fuel level gauge provided with the remaining-amount warning apparatus according to the present invention.
Figure 8:
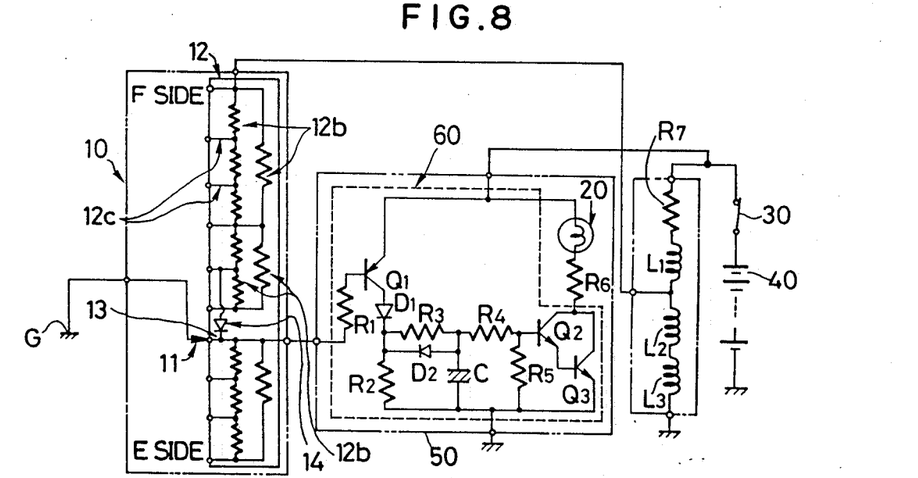
FIG. 8 is a circuit diagram specifically showing the delay circuit shown in the circuit of FIG. 7.

FIG. 7 shows another embodiment in which a delay circuit 60 is incorporated in the circuit 50 in order to overcome the above-described problem. FIG. 8 specifically shows the delay circuit 60 of FIG. 7.

The delay circuit 60 consists of, for example, transistors Q1, Q2 and Q3, diodes D1 and D2, and resistors R1 to R5, and a capacitor C. The base of the transistor Q1 is connected to the remaining-amount warning point 13 through the resistor R1. The transistors Q2, and Q3 are connected to each other in a Darlington form, and the collectors thereof are connected to the warning lamp 20 through the resistor R6. The diodes D1 and D2, the resistors R1 to R5, and the capacitor C are interposed between the collector of the transistor Q1 and the base of the transistor Q2. The resistance value of the resistor R1 is selected to be larger than that of the resistor R7 connected to the coil L1 of the resistance plate 12. Accordingly, even if the sliding element 11 travels towards the E side beyond the remaining-amount warning point 13, the current flowing in the coils L1 to L3 is not influenced.

In this embodiment, when the sliding element 11 travels to the remaining-amount warning point 13, the transistor Q1 conducts and, after the passage of a time period corresponding to the time delay determined by the timing constants R3 and C of the respective resistor R3 and the capacitor C, the transistors Q2 and Q3 starts to conduct, thereby causing the warning lamp 20 to light.

If the floating arm 156 vibrates due to the liquid level changes of the fuel in the fuel tank which may be caused by vibrations or the like and the sliding element 11 temporarily travels towards the F side beyond the remaining-amount warning point 13, the transistor Q1 is temporarily placed in a non-conducting state and, at this time, the capacitor C instantaneously discharges through the diode D2 and the resistor R2, whereby the warning lamp 20 is prevented from flickering. In addition, even while the sliding element 11 is travelling toward the E side from the remaining-amount warning point 13, an indication of the amount of remaining fuel is not at all influenced. Moreover, since the current is amplified by the Darlington connection formed between the transistors Q2 and Q3, the size, the configuration and the like of the warning means which serves as a load are not restricted, and various kinds of warning means different from the warning lamp 20 may be employed.

Figure 9:
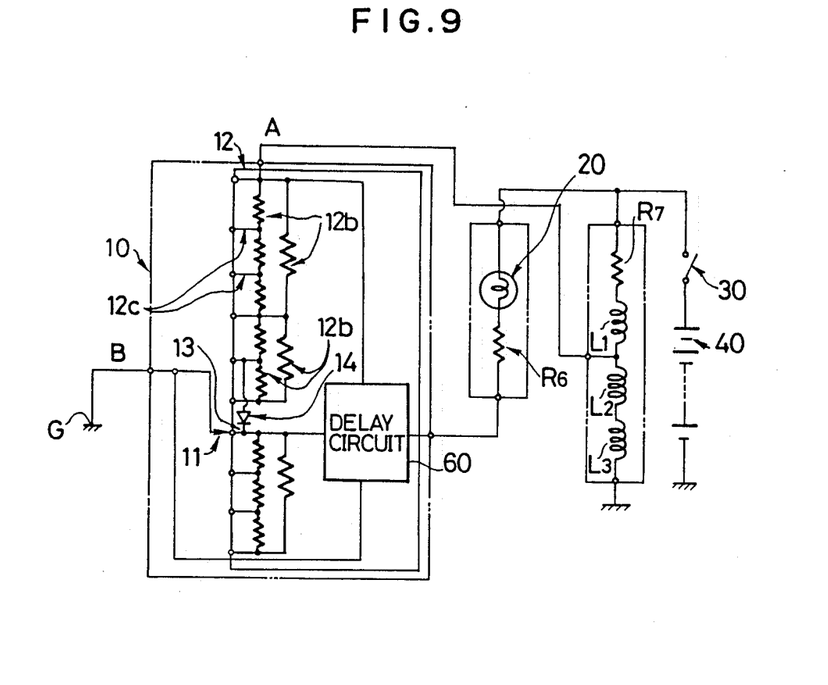
FIG. 9 is an electrical circuit diagram showing still another embodiment of the fuel level gauge provided with the remaining-amount warning apparatus according to the present invention.
Figure 10:
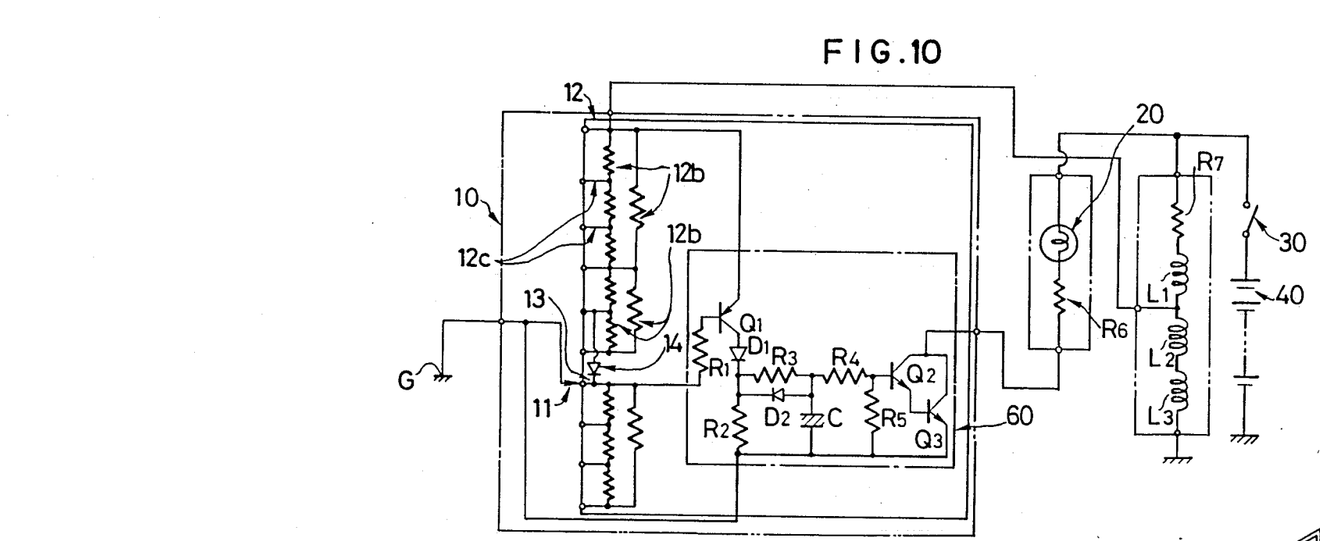
FIG. 10 is a circuit diagram specifically showing the portion of a delay circuit in the circuit shown in FIG. 9.

FIG. 9 shows still another embodiment in which the delay circuit 60 is incorporated in the circuit of the resistors 12b. FIG. 10 specifically shows a portion corresponding t the delay circuit 60 shown in FIG. 9. The construction of the delay circuit 60 is the same as that shown in FIG. 7, and the resistance value of each of the resistors R1 to R7, etc. disposed in the delay circuit 60 is selected to be larger than the resistance value of the resistor R7 connected to the coil L1 and the resistance value of each of the resistors 12b.

If the delay circuit 60 is incorporated in the circuit of the resistors 12b as in this embodiment, the voltage provided between the points A and B of the resistors 12b becomes large in the vicinity of the remaining-amount warning point 13 (refer to FIG. 5), and an electrical power source for exclusive use with the delay circuit 60 need not be provided.

It is to be noted that if an electrical power source for exclusive use with the delay circuit 60 is provided, the freedom of circuit design can be extended compared to the above-described embodiment.

Figure 11:
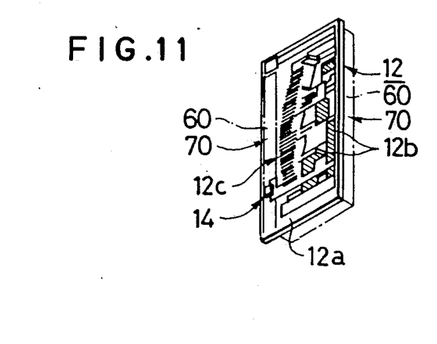
FIG. 11 is a view showing the external appearance of the resistance plate shown in FIG. 9.

FIG. 11 is a perspective view showing the external appearance of the resistance plate 12 used in the embodiment of FIG. 9. As illustrated, the delay circuit 60 and the diode 14 are mounted on the board 12a, and the circuit elements are sealed with a sealing compound 70 having durability with respect to fuel. Accordingly, no exclusive board on which the delay circuit 60 is to be mounted is needed, and it is also possible to effectively utilize the board 12a of the resistance plate 12.

Figure 12:
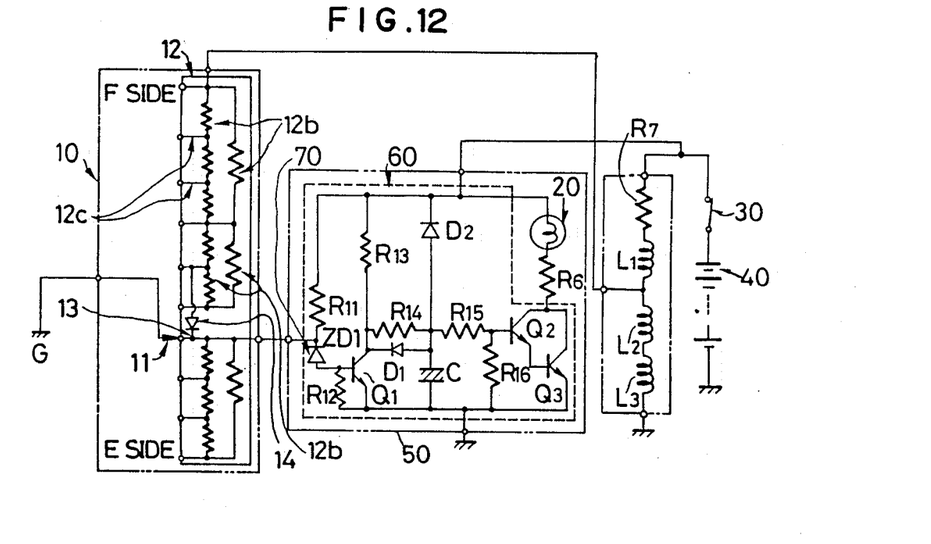
FIG. 12 is an electrical circuit diagram showing a further embodiment of the fuel level gauge provided with the remaining-amount warning apparatus according to the present invention.

FIG. 12 shows still another embodiment. This embodiment has a construction similar to that of the embodiment shown in FIG. 7, but these embodiments differ from each other in terms of the construction of the delay circuit. Accordingly, the same reference numerals are used to denote the remaining elements and the detailed description thereof is omitted. Although this embodiment is provided with the transistor $Q_1$, $Q_2$ and $Q_3$, diodes $D_1$ and $D_2$, resistors $R_{11}$ to $R_{16}$, and capacitor C as in the embodiment of FIG. 7, a great difference between these embodiments is that a Zener diode ZDI is inserted between the remaining-amount warning point 13 and the transistor $Q_1$. If the sliding element 11 is now positioned on the F side with respect to the remaining-amount warning point 13, the potential on the cathode side of the Zener diode ZDI is at a high level, so that the transistor $Q_1$ is on (operative) and the capacitor C is not charged. Accordingly, the transistors $Q_2$ and $Q_3$ are off and no current flows in the warning lamp 20. When the sliding element 11 reaches the remaining-amount warning point 13, the potential on the cathode side of the Zener diode ZDI falls, the transistor $Q_1$ is turned off, and the capacitor C is charged. After delayed by the time period defined by the time constants of a resistor $R_{14}$ and the capacitor C, the transistors $Q_2$ and $Q_3$ are turned on so that a current is allowed to flow in the warning lamp 20 to cause it to light. As described above, in this embodiment, controlling means 70 for the capacitor C consists essentially of the Zener diode ZDI and the transistor $Q_1$. This controlling means 70 operates in accordance with a voltage which changes by the presence or absence of a current flowing in the remaining-amount warning point 13, and controls the charge and the discharge of the capacitor C.

Figure 13:
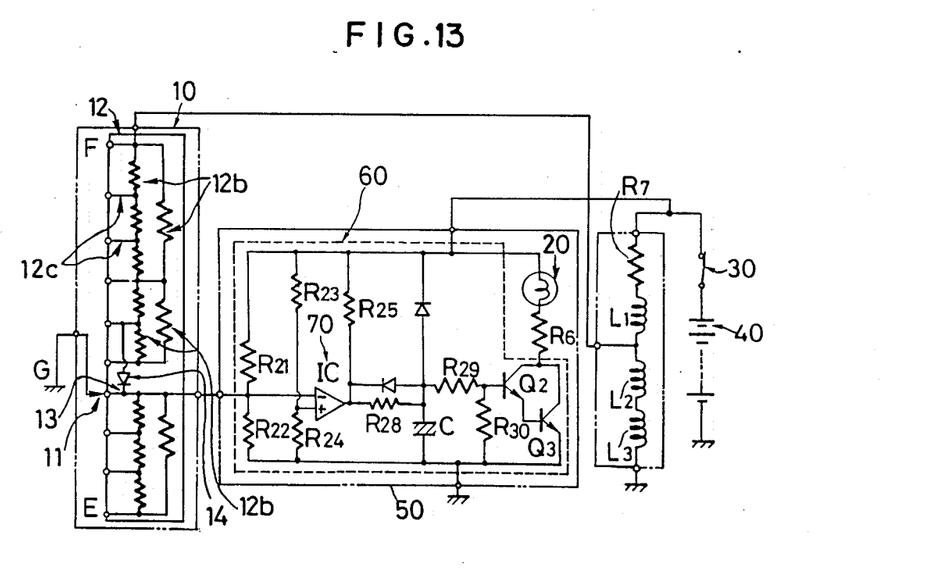
FIG. 13 is a circuit diagram of a modification of the embodiment shown in FIG. 12.

FIG. 13 shows a modification of the aforesaid embodiment shown in FIG. 12, and the embodiment of FIG. 13 is also provided with the transistors $Q_1$, $Q_2$ and $Q_3$ and resistors $R_{21}$ to $R_{25}$, $R_{28}$ to $R_{30}$ but differs from that shown in FIG. 12 in that the controlling means 70 consists of a comparator IC. As shown in FIG. 13, an intermediate point between resistors $R_{21}$ and $R_{22}$ and an intermediate point between resistors $R_{23}$ and $R_{24}$ serve as the respective inputs of the comparator IC. If the sliding element 11 is positioned on the F side with respect to the remaining-amount warning point 13, the potential at the intermediate point between the resistors $R_{21}$ and $R_{22}$ is higher than the potential at the intermediate point between the resistors $R_{23}$ and $R_{24}$. Accordingly, the comparator IC is turned on, the capacitor C is not charged, and the transistors $Q_2$ and $Q_3$ are off. If the sliding element 11 reaches the remaining-amount warning point 13, the potential at the intermediate point between the resistors $R_{21}$ and $R_{22}$ becomes lower than the potential at the intermediate point between the resistors $R_{23}$ and $R_{24}$. Accordingly, the comparator IC is turned off and the capacitor C is charged. After delayed by a time period determined by the respective time constants of the capacitor C and a resistor $R_{28}$, the transistors $Q_2$ and $Q_3$ are turned on and the warning lamp 20 is caused to light.

In arrangements of the type in which the charge and the discharge of the capacitor C ar controlled by utilizing a change in voltage in a manner similar to that used in the above embodiment, even if the resistors 12b are immersed in a liquid, such as alcohol, having a low degree of insulation and a slight amount of current flows, the capacitor C is not unnecessarily charged to cause the warning lamp 20 to light.

It will be understood that the foregoing diselosure of the embodiments of the present invention is for the purposes of illustration only, and that various modifications may be readily achieved by those skilled in the art without departing from the true spirit and scope of the invention.

What is claimed is:

1. A fuel level gauge provided with a remaining-amount warning apparatus, comprising:
   means for indicating the amount of fuel remaining in a fuel tank;
   a resistor device for operating said indicating means and including a resistance plate having a resistor and a sliding element arranged to slide on said resistor on said resistance plate in accordance with a liquid level change in said fuel tank;
   warning means for issuing a warning when said amount of remaining fuel reaches a predetermined amount which requires issuance of the warning,
   a diode disposed on said resistance plate to form a remaining-amount warning point on said resistance plate, said remaining-amount warning point being the position on said resistor at which said sliding element is positioned when said amount of remaining fuel reaches said predetermined amount; and
   a circuit connecting said resistor device and said warning means for causing said warning means to operate when said sliding element reaches said remaining-amount warning point.

2. A fuel level gauge provided with a remaining-amount warning apparatus according to claim 1, wherein said circuit is connected to said resistor device at the side on which said sliding element is positioned when the amount of fuel decreases from said predetermined amount and said diode is operable to prevent a current from flowing in said warning means when said fuel tank is filled with fuel beyond said remaining-amount warning point and to open said circuit when the amount of fuel decreases below said predetermined amount.

3. A fuel level gauge provided with a remaining-amount warning apparatus according to claim 1, wherein said circuit includes a diode disposed between said remaining-amount warning point and a resistor located on the side on which said sliding element is positioned when said fuel tank is filled with fuel, said diode operating to prevent a current from flowing in said warning means when said sliding element is positioned on said side.

4. A fuel level gauge provided with a remaining-amount warning apparatus according to claim 1, wherein said circuit includes a delay circuit for delaying the operation of said warning means.

5. A fuel level gauge provided with a remaining-amount warning apparatus according to claim 4, wherein said delay circuit is incorporated in the circuit of said resistor, mounted on a board of said resistance plate, and sealed with a sealing compound which has durability with respect to fuel.

6. A fuel level gauge provided with a remaining-amount warning apparatus according to claim 3, wherein said delay circuit includes a first transistor connected to said remaining-amount warning point, a second transistor connected to said warning means, and a capacitor disposed between said first transistor and said second transistor.

7. A fuel level gauge provided with a remaining-amount warning apparatus according to claim 6, wherein said delay circuit has controlling means arranged to operate in accordance with changes in a voltage caused by the presence or absence of a current flowing in said remaining-amount warning point, said controlling means controlling the charge and the discharge of said capacitor of said delay circuit.

8. A fuel level gauge provided with a remaining-amount warning apparatus according to claim 7, wherein said controlling means includes a Zener diode disposed between said remaining-amount warning point and said first transistor.

9. A fuel level gauge provided with a remaining-amount warning apparatus according to claim 7, wherein said controlling means includes a comparator disposed between said remaining-amount warning point and said capacitor.

10. A fuel level gauge provided with a remaining-amount warning apparatus, comprising:
    means for indicating the amount of fuel remaining in a fuel tank;
    means for driving said indicating means;
    warning means for issuing a warning when said amount of remaining fuel reaches a predetermined amount;
    a sender secured to said fuel tank and provided with a frame and a floating arm which is rotatably secured at a proximal end thereof to said frame and which has a float at the other end, said float floating in accordance with a change in a liquid level in said fuel tank;
    a resistor device including a sliding element secured to the proximal end of said floating arm and arranged to slid in accordance with the floating motion of said float and a resistor secured to said frame and connected at one end to said driving means;

a remaining-amount warning point set on said resistor and representing the position on said resistor at which said sliding element is positioned when said amount of remaining fuel decreases to a level which requires issuance of a warning; and a circuit disposed to connect said remaining-amount warning point and said warning means and to cause said warning means to operate when said sliding element reaches said remaining-amount warning point on said resistor.

11. A fuel level gauge provided with a remaining-amount warning apparatus according to claim 10, wherein said warning means is a warning lamp.

12. A fuel level gauge provided with a remaining-amount warning apparatus according to claim 10, wherein said warning means is a buzzer.

* * * * *